2 Sheets—Sheet 1.

E. D. MEAD,

Assignor of one-half to THE FARMERS FRIEND MANUFACTURING COMPANY.

MACHINE FOR SOWING FERTILIZERS.

No. 10,001. Reissued Jan. 3, 1882.

Witnesses.
Robert Everett
Jno. S. Jones

Inventor.
Edwin D. Mead.
By Wood & Boyd
Attys.

2 Sheets—Sheet 2.

E. D. MEAD,

Assignor of one-half to THE FARMERS FRIEND MANUFACTURING COMPANY.

MACHINE FOR SOWING FERTILIZERS.

No. 10,001. Reissued Jan. 3, 1882.

Witnesses.
Robert Everett,
Jno. E. Jones

Inventor.
Edwin D. Mead.
By Wood & Boyd
Attys.

UNITED STATES PATENT OFFICE.

EDWIN D. MEAD, OF SHORTSVILLE, NEW YORK, ASSIGNOR OF ONE-HALF TO THE FARMERS FRIEND MANUFACTURING COMPANY, OF DAYTON, OHIO.

MACHINE FOR SOWING FERTILIZERS.

SPECIFICATION forming part of Reissued Letters Patent No. 10,001, dated January 3, 1882.

Original No. 218,759, dated August 19, 1879. Application for reissue filed August 6, 1881.

*To all whom it may concern:*

Be it known that I, EDWIN D. MEAD, a citizen of the United States, residing at Shortsville, in the county of Ontario and State of New York, have invented certain new and useful Improvements relating to Machines for Applying or Sowing Fertilizing Material; and I do hereby declare that the following is a full and exact description thereof.

The invention consists in a fertilizer-distributer having a horizontally-rotating feed-wheel arranged in the bottom of the hopper and a discharge-orifice arranged near the periphery, in combination with a hinged or pivoted gate adapted to work over the mouth of the orifice to regulate the quantity to be discharged.

The invention also consists in a fertilizer-distributer having a series of horizontally-rotating disks or feed-wheels arranged in the bottom of the hopper and a series of discharge-orifices arranged near the peripheries of the feed-wheels, in combination with a series of hinged or pivoted gates adapted to work over the mouths of the orifices and pivoted to a common connecting-rod, whereby the series of gates may be simultaneously operated to open, close, and regulate the quantity to be discharged.

The invention also consists in a novel mode of constructing the hopper-bottom and revolving the feed-wheel therein.

The invention also consists in a horizontally-rotating fertilizing-distributer mounted on an axis, combined with a revolving scraper or cleaner mounted on an independent axis.

Other features of my invention will be more fully and specifically set forth in the description of the accompanying drawings.

Figure 1:
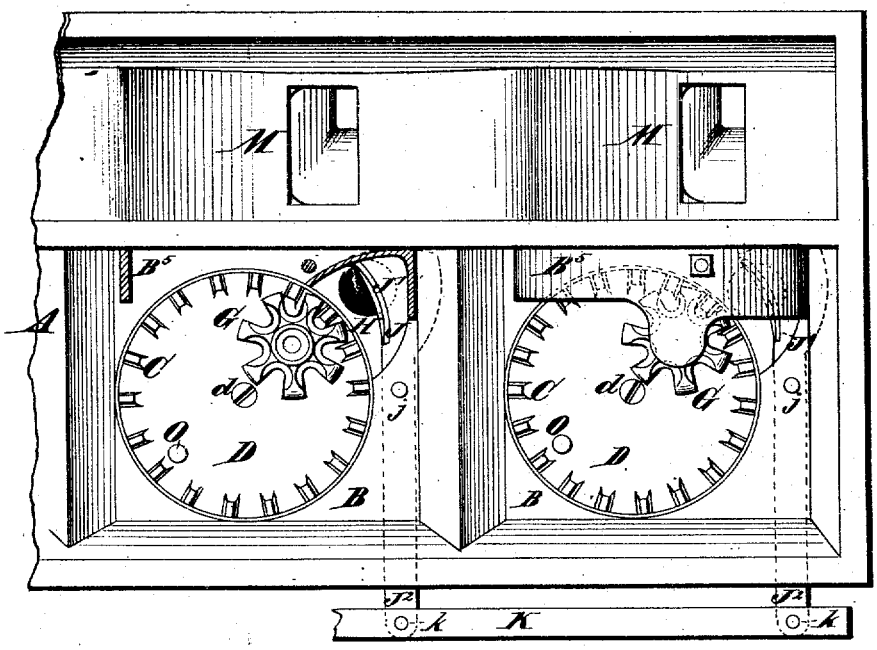
Figure 2:
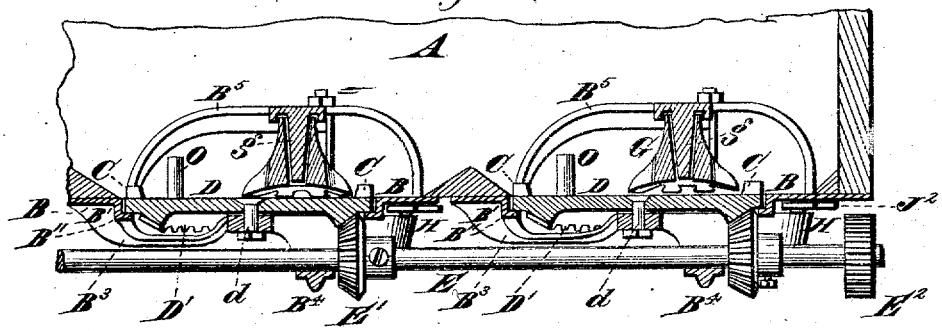
Figure 3:
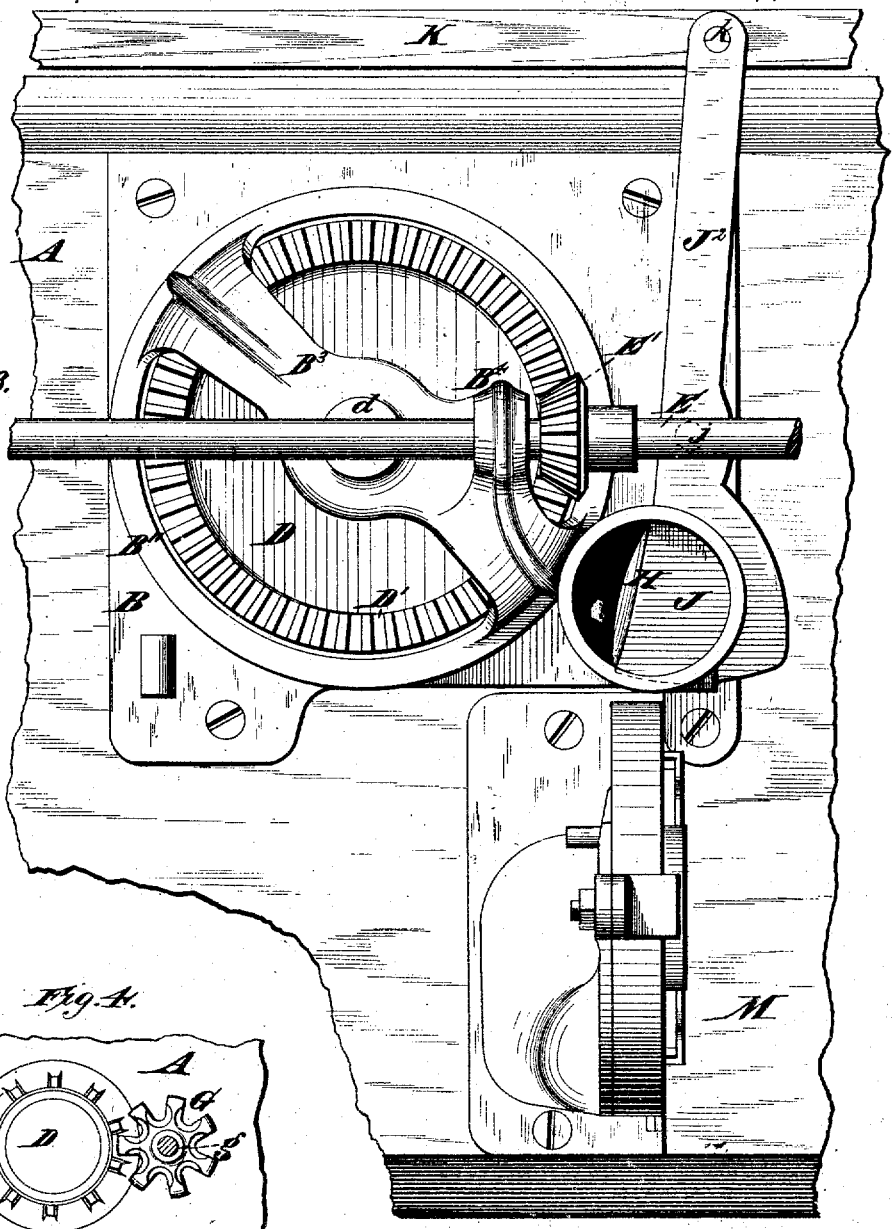
Figure 4:
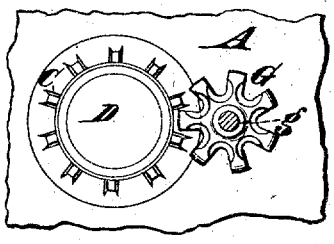

In the accompanying drawings, Figure 1 is a top plan view of the horizontal feeding devices and adjustable gates for regulating the quantity of distribution. Fig. 2 is a sectional elevation, showing the operative parts of the device. Fig. 3 is a bottom plan view of my improvement attached to the hopper of the machine. Fig. 4 is a plan view, representing a modification.

One of the commonest forms of fertilizing material which it is desired to apply to land by means of my machine or analogous machines is a powdery superphosphate of lime. This material is liable to become, by the shaking of the machine, very closely compacted together. In damp weather it is liable to form a hard cake. It is important to provide means for keeping it from bridging and for clearing or cleaning the surfaces of the distributing machinery. The main part which is liable to become clogged is the wheel or corresponding device, which is provided with recesses and is partially immersed in the pasty mass.

A is the hopper, which contains the superphosphate to be distributed.

B B are castings formed with circular openings adapted to receive the feed-wheel D. Around each of the circular openings is a vertically-projecting flange, B′, with a horizontal flange, B″, adapted to support the wheel D by its periphery, as represented. The under face of each wheel D is formed with a series of beveled-gear teeth, D′, placed immediately within the peripheral bearing. These engage with corresponding driving-pinions, E′, on the driving-shaft E, which latter is supported in suitable bearings, $B^4$, on the fixed frame-work of the machine, and receives motion through the pinion E″ from gearing on or connected with the driving-wheel. (Not represented.)

The upper face of the wheel D may be plain or may have ribs extending from its spaced projections C toward the center. The whole face of the feed-wheel carries the phosphate. The cavities or recesses between these projections C serve as conveyers. They are filled by their rotation under the mass of powdery fertilizer, and bring the material from distant points to the immediate vicinity of the discharge-orifice H.

A spider-frame or bridge-tree, $B^3$, formed in one piece with or fixed on the casting B, extends across under each wheel D and forms a firm support for the axial journal *d*, on which wheel D revolves, and forms a support for the bearings $B^4$, in which the transmitting-shaft journals. A yoke frame or arch, $B^5$, is also cast on or firmly fixed to each casting B. It serves as a support for a stout pivot or axle, *g*, on which turns a clearing-wheel, G.

This wheel performs an important function in clearing the upper surface of the proper quantity of superphosphate to be delivered down the spout or distributing-passage H. The form and functions of this clearing-wheel G and its mode of mounting are peculiar. Its lower face runs close to the upper face of the wheel D. Its axis *g* is slightly inclined, so that it bears only at the periphery of the wheel D. It is formed with wings analogous to cogs, which engage with the projections C on the upper face of the distributing-wheel D. These compel the clearing-wheel G to revolve and the wings of the wheel G to act as clearers to force the superphosphate off from the face of the feed-wheel. The wings are beveled, as shown. The projections C are correspondingly beveled.

In damp weather the superphosphate is liable to become pasty under a kneading action. When thus conditioned it will pack if the form of construction is not carefully attended to. The beveled edge of my scraper-wheel scrapes the surface of the feed-wheel and lifts the phosphate, as it is forced to the orifice for discharge, sufficiently to keep it from packing. As the machine is drawn over the ground the shaft E is rotated by the power received from the driving-wheel, and, being provided with pinions E′ corresponding to each distributing-wheel D, gives a continuous rotatory motion to the entire set. Each wheel D, being geared and pivoted as shown, receives a strong uniform motion, its pin O keeping the superphosphate above stirred up in the immediate vicinity of the wheel. The upper part of the mass is saved from any agitation and kneading. No particle becomes stirred until the material below it has been so far consumed as to let it down into the vicinity of the feed-wheel. Then it is certain to be agitated by the revolution of the wheel D under it and by the action of the pin or pins O projecting from its upper face. The projections C stand favorably situated to receive the phosphate, and by the rotation of the wheel to convey into the vicinity of the discharge-orifice H a liberal supply of the superphosphate. The clearing-wheel G stands favorably situated to scrape the whole upper surface of the feed-wheel, and also by its beveled wings to act between each of the beveled projections C, and to force out all the superphosphate which may be contained between the said projections.

J is a gate turning on a center, *j*, fixed in the casting B, and adapted, when properly placed, to cover the whole of the discharge-orifice H, and by adjusting will feed out any desired quantity as the distributing-wheel D brings around into the neighborhood of the orifice H a supply of the phosphate.

It will be seen that if the gate J is so nearly closed as to allow but little of the phosphate to pass through the orifice the wings of the clearing-wheel G, being beveled, lift the balance, and it remains undischarged.

The front face of the gate J, adjacent to the distributing-wheel D, has a high lip. This serves to crush any lumps of phosphate which may have been formed and brought around into the proper position. The revolution of the wheel G, in acting on such lumps, instead of pushing them off radially over the upper surface of the gate, mashes them against the front lip, J′, and the whole or a portion of each lump is dropped down the discharge-orifice. Each gate J J′ has a long lever, $J^2$, which is connected by a pin, *k*, to a rod, K. This rod K extends across the machine and is controlled by the attendant. It may be held by a pinching-screw, or otherwise, in any desired position in which it is adjusted. This single rod K, therefore, adjusts all the discharge-gates of the entire series. So also the ratio of the size of the clearing-wheel G to the distributing-wheel D may be varied.

It will be understood that there may be some approved form of mechanism worked in the adjacent hopper M for distributing seeds, and that the seeds may be sown broadcast or conveyed down tubes, either with the fertilizing material or independently, as may be preferred.

I have not deemed it necessary to represent any seeding device.

Any desired form and arrangement of guide-tubes, plows, and the like may be employed with my invention in the same manner as with ordinary fertilizer-distributers.

Fig. 4 represents a modification in which the central pivot of the distributing-wheel is dispensed with. The discharge-orifice is in the center of the distributing-wheel. The great mass of the fertililizing material is prevented from falling through this by any convenient means, as a cylindrical casing or a circular plate covering the main part of the hole, and leaving a sufficient orifice at the side adjacent to the clearing-wheel.

The motion may be imparted to the annular feed-wheel in the same manner as above, and the action of the wings and the clearing-wheel G will act by the beveled edges and wings to clear the spaces between the projections C in the same manner as already described; but in this case they will work from the exterior inward. The pivot or axis on which the wheel G turns is in this case outside of the distributing-wheel instead of within its area. The bevel of the projections C must in this be on the outer instead of the inner edges of the projections C.

The parts may be made with sufficient accuracy with little or no finishing by tools. With an ordinary good fit between the periphery of the feed-wheel D and the vertical flange B′, which surrounds it, and the flange B″, which underlies it, a little lubricating material applied at intervals serves not only to relieve the friction, but also to make and maintain a tight joint, and prevent any escape of the fertilizer around the feed-wheel.

It will be observed that my construction allows the pin or arm O to move freely around in combination with the clearer G, and without interfering with it. In passing the clearer the pin applies in one of the notches therein.

The notched form of my clearer is important in providing for the passage of the pin O; and it also serves a useful function in communicating the proper rotatory motion from the wheel D by means of the projections C engaging therewith. The projections C in this case perform the double functions of conveyers to insure that the wheel shall by its rotation transport the loose material lying thereon to the delivery-hole H, and also of teeth to rotate the wheel G; but some of the benefits of my invention might be obtained by rotating the clearer G by other means. Machines for sowing or distributing have been heretofore made with a horizontally-revolving feed-wheel. In these, however, the feed-wheel is located within the bottom of the hopper, or when it forms itself a portion of the bottom it is suspended below the bottom by a central shaft. By this invention the feed-wheel itself forms part of the bottom of the hopper, and is supported at its rim by a depending lip and flange on the portion surrounding the aperture in which it is placed.

I claim—

1. A fertilizer-distributer having a horizontally-rotating feed-wheel arranged in the bottom of the hopper and a discharge-orifice arranged near the periphery, in combination with a hinged or pivoted gate adapted to work over the mouth of the orifice to regulate the quantity to be discharged, substantially as set forth.

2. A fertilizing-distributer having a series of horizontally-rotating disks or feed-wheels arranged in the bottom of the hopper and a series of discharge-orifices arranged near the peripheries of the feed-wheels, in combination with a series of hinged or pivoted gates adapted to work over the mouths of the orifices and pivoted to a common connecting-rod, substantially as set forth.

3. The combination, with a horizontally-rotating fertilizer-distributer and the bed-plate forming a bearing for the same, of a revolving scraper or cleaner mounted on an independent axis, substantially as described.

4. In a fertilizer-distributer, the sectional hopper-bottom B, having an annular bearing for the feed-wheel, and the bridge-tree $B^3$, substantially as herein set forth.

5. In a fertilizing-distributing device, the sectional bottom B, having the annular supports for the rotatory feed-wheel, and the bridge-tree $B^3$, or center for supporting the vertical axial journal on which the feed-wheel revolves, substantially as herein set forth.

6. In a fertilizing-distributing device, a series of sectional hopper-bottoms, B, having annular supports for the feed-wheels, and a bridge-tree for supporting the axial shaft of the feed-wheel, and sleeve bearings for the horizontal transmitting-shaft, on which are a series of pinions respectively meshing with the cogs on the periphery of the feed-wheel, whereby rotatory motion is imparted to the feed-wheels, substantially as herein set forth.

7. In a fertilizer-distributer, the sectional hopper-bottom B, having an annular support for the horizontally-rotating feed-wheel, and a bridge-tree attached to said sectional bottom, on which is supported the axial shaft-journal upon which said feed-wheel revolves, substantially as herein set forth.

8. A horizontal rotating fertilizing-distributer mounted on an axis, in combination with a revolving scraper or cleaner mounted on an independent axis, substantially as herein set forth.

9. A fertilizer-distributer composed sustantially of a horizonal rotating feed-wheel and a series of projections, C, arranged upon the upper space of the feed-wheel, in combination with the revolving scraper or clearer G, as set forth.

10. In combination with the horizontally-rotating wheel, having a circular series of teeth-projections, C, the horizontally-revolving clearer-wheel G, provided with scraper-teeth *g*, which revolve eccentrically through the spaces between the teeth C of feed-wheel and the scraper-teeth *g* of the clearer-wheel, meshing with and being driven by the teeth of the feed-wheel D, substantially as herein set forth.

11. A fertilizer-distributer having the feed-wheel D, revolving clearer, and stir-pins O, arranged to serve in combination as herein specified.

12. In a fertilizer-distributer, the combination of a horizontally-rotating disk or feed-wheel arranged in the bottom of the hopper and a horizontally-revolving wheel having a beveled rim or edge revolving eccentrically over the surface of the disk or feed-wheel, and adapted to scrape and discharge the fertilizing material from the disk or feed-wheel into a discharge-chute, substantially as and for the purpose described.

13. In a fertilizer-distributer, the bottom of the feed-hopper composed of a series of sectional bottoms, B, and the series of horizontally-rotating feed-wheels supported upon the sections B, substantially as herein set forth.

In testimony whereof I have hereunto set my hand in the presence of two subscribing witnesses.

EDWIN D. MEAD.

Witnesses:

ABIAL ALLEN,

WM. A. WILLSON.